United States Patent [19]

Powers et al.

[11] Patent Number: 5,511,367
[45] Date of Patent: *Apr. 30, 1996

[54] LAWN MOWER HAVING ADDITINAL IMPROVED TRIM FEATUURE

[75] Inventors: James R. Powers, Conyers; John W. Wilder, McDonough; Frank H. Hancock, Jr., McDonough; Amos G. Hill, McDonough, all of Ga.

[73] Assignee: The Actava Group, Inc., McDonough, Ga.

[ * ] Notice: The term of this patent shall not extend beyond the expiration date of Pat. No. 5,488,818.

[21] Appl. No.: 283,710

[22] Filed: Aug. 1, 1994

Related U.S. Application Data

[63] Continuation-in-part of Ser. No. 84,031, Jun. 28, 1993.

[51] Int. Cl.$^6$ .................................................. A01D 34/68
[52] U.S. Cl. ............................ 56/11.2; 56/11.5; 56/11.8; 180/6.48; 180/19.3
[58] Field of Search ...................... 56/11.4, 11.2, 56/11.5, 11.8; 180/6.48, 19.3

[56] References Cited

U.S. PATENT DOCUMENTS

| | | |
|---|---|---|
| 2,329,372 | 9/1943 | Hitch . |
| 2,523,014 | 9/1950 | Gooch . |
| 2,588,004 | 3/1952 | Holmes . |
| 2,601,752 | 7/1952 | Rose . |
| 2,766,834 | 10/1956 | Boyer . |
| 2,941,609 | 6/1960 | Bowers et al. . |
| 3,306,385 | 2/1967 | Kempson . |
| 3,323,607 | 6/1967 | Futamata . |
| 3,528,519 | 9/1970 | Case . |
| 3,540,220 | 11/1970 | Lauck . |
| 3,541,877 | 11/1970 | Houk . |
| 3,613,817 | 10/1971 | Glass et al. . |
| 3,616,869 | 11/1971 | Rilling et al. ........................ 180/6.48 |
| 3,620,096 | 11/1971 | Scolari . |
| 3,816,985 | 6/1974 | Sorenson et al. ........................ 56/7 |
| 3,876,021 | 4/1975 | Baumgartner ........................ 180/6.48 |
| 3,891,042 | 6/1975 | Braun ........................ 180/6.48 |
| 3,946,543 | 3/1976 | Templeton ........................ 56/10.9 |
| 4,043,416 | 8/1977 | Albright et al. ........................ 180/6.48 |
| 4,085,512 | 4/1978 | Robinson et al. ........................ 180/6.48 |
| 4,146,105 | 3/1979 | Scag ........................ 180/70 R |
| 4,152,950 | 5/1979 | Langford ........................ 74/471 XY |
| 4,213,484 | 7/1980 | Habigger ........................ 137/636.1 |
| 4,301,881 | 11/1981 | Griffin ........................ 180/6.48 |
| 4,321,980 | 3/1982 | Nissen ........................ 180/333 |
| 4,327,539 | 5/1982 | Bricko et al. ........................ 56/113 |
| 4,487,006 | 12/1984 | Scag . |
| 4,572,019 | 2/1986 | Suzuki ........................ 74/471 XY |
| 4,580,455 | 4/1986 | Beugelsdyk et al. ........................ 74/2 |
| 4,667,459 | 5/1987 | Scanland et al. ........................ 56/11.3 |
| 4,736,647 | 4/1988 | Shimoie et al. ........................ 74/471 XY |
| 4,753,062 | 6/1988 | Roelle ........................ 56/10.5 |
| 4,787,195 | 11/1988 | Wenzel ........................ 56/11.1 |
| 4,799,398 | 1/1989 | Asano ........................ 74/473 R |
| 4,809,796 | 3/1989 | Yamaoka et al. ........................ 180/6.48 |
| 4,835,949 | 6/1989 | Seyerle ........................ 56/10.8 |
| 4,885,903 | 12/1989 | Scag ........................ 56/10.8 |
| 4,920,733 | 5/1990 | Berrios ........................ 56/10.9 |
| 4,930,369 | 6/1990 | Barnard et al. ........................ 74/480 R |
| 4,991,382 | 2/1991 | Scag ........................ 56/10.9 |
| 4,998,948 | 3/1991 | Osterling ........................ 56/12.6 |
| 5,020,308 | 6/1991 | Braun et al. ........................ 56/11.3 |
| 5,042,239 | 8/1991 | Card ........................ 56/14.7 |
| 5,131,483 | 7/1992 | Parkes ........................ 180/6.48 |
| 5,146,735 | 9/1992 | McDonner ........................ 56/11.3 |
| 5,279,376 | 1/1994 | Yang et al. ........................ 180/6.48 |
| 5,375,674 | 12/1994 | Peter ........................ 56/11.8 X |

*Primary Examiner*—Terry Lee Melius
*Attorney, Agent, or Firm*—Jones & Askew

[57] ABSTRACT

A lawn mower is provided having improved steering controls, namely a "trim" feature which may be adjusted while the mower is in a forward speed setting. Further provided is a park lock feature which locks the speed controls of the mower. Finally, a neutral latch feature is provided which becomes engaged when the left and fight steering controls of the mower are simultaneously position in either a neutral or a reverse position.

11 Claims, 12 Drawing Sheets

LAWN MOWER HAVING ADDITINAL IMPROVED TRIM FEATUURE

TECHNICAL FIELD

This is a continuation-in-part of U.S. application No. 08/084,031, filed Jun. 28, 1993.

This invention relates in general to lawn mowers, and particularly relates to controls for a lawn mower providing improved steering features.

BACKGROUND OF THE INVENTION

In the field of lawn mowers, a need has been recognized for improved steering of lawn mowers. A particular need is apparent in the instance of hydraulically-driven lawn mowers. In hydraulically-driven lawn mowers, an engine (typically a gasoline-powered internal combustion engine) powers one or more hydraulic pumps, which drive two hydraulic motors which themselves drive wheels of a lawn mower. By controlling the flow of hydraulic fluid to the two hydraulic motors, the relative speed and rotation of the drive wheels may likewise be controlled. Such is shown in U.S. Pat. No. 3,876,021 to Baumgartner, incorporated by reference, a single engine drives two fluid pumps which drive two corresponding motors, each being coupled to a corresponding rear drive wheel. Control arms control the flow from the pumps.

A need has been recognized for a control system for such mowers which provides a "trim" feature, which allows the operator to finely adjust the relative speed of the drive wheels while the machine is moving. This may be especially needed when the operator has long stretches of straight-line operation; as may be understood, it is disadvantageous for an operator to have to continuously adjust the hand controls in order to keep the mower running in a straight line. By providing a trim feature, the operator can fine-tune the speed of the wheels to cause the mower to run in a substantially straight line. A trim feature may also be helpful when an operator is cutting on a hill; in such situations the mower may tend to turn downhill, and the trim feature can be used to compensate for such movement. A trim feature requiring no tools for adjustment would also be advantageous.

A need has also been recognized for a control lock feature which prevents actuation of controls either intentionally or unintentionally, unless the operator physically unlocks the controls.

Finally, a need has also been recognized for a latching feature which must be disengaged after the mower has been backed up.

SUMMARY OF THE INVENTION

The present invention overcomes disadvantages in the prior art by providing a lawn mower having steering controls which allow the steering of the lawn mower to be "trimmed", as well as a lawn mower having an improved locking feature.

It is an object of the present invention to provide an improved steering control for a lawn mower.

It is a further object of the present invention to provide a lawn mower which has an improved trim feature.

It is a further object of the present invention to provide a lawn mower which has an improved locking feature.

It is a further object of the present invention to provide a lawn mower which is cost-efficient in operation.

It is a further object of the present invention to provide a lawn mower which is cost-efficient to produce.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

General Construction and Operation

Figure 1:
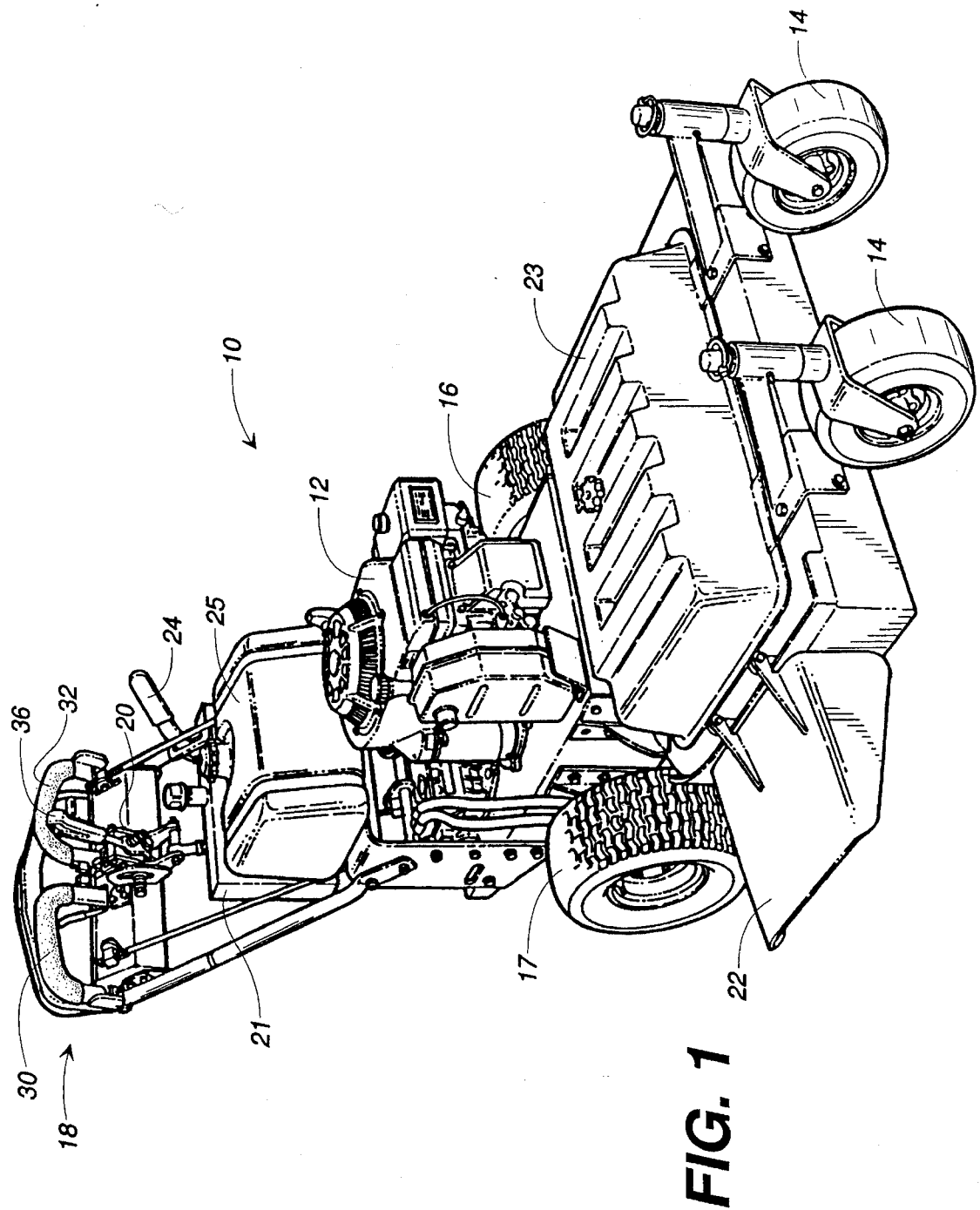
FIG. 1 is a front, right side pictorial view of a lawn mower according to the present invention.

Referring now to FIG. 1, a walk-behind commercial-type lawn mower 10 is illustrated. This lawn mower 10 includes an engine 12 (typically an internal combustion engine), a pair of front wheels 14, a left rear drive wheel 16, a right rear drive wheel 17, a handle assembly 18 (including a trim control subassembly 20), a grass deflector 22, a cutter engagement lever 24, a belt cover 23, a gasoline container 25, and an oil reservoir 21.

General Operation

As discussed in further detail later in this application, an operator's right and left hands 26, 28, may be used to control the right and left speed control handles, 30, 32, respectively, as well as the joystick lever 36, and the operator presence bar 38 which is directly behind the upper handlebar 40. As may be understood, the operator presence bar 38 must be in its "forward" position biased against the rear side of upper handlebar 40, in order for the engine to drive the drive wheels. When the operator presence control is not so engaged, the engine may be disconnected from its ignition source through suitable electric wiring known in the art.

Figure 2:
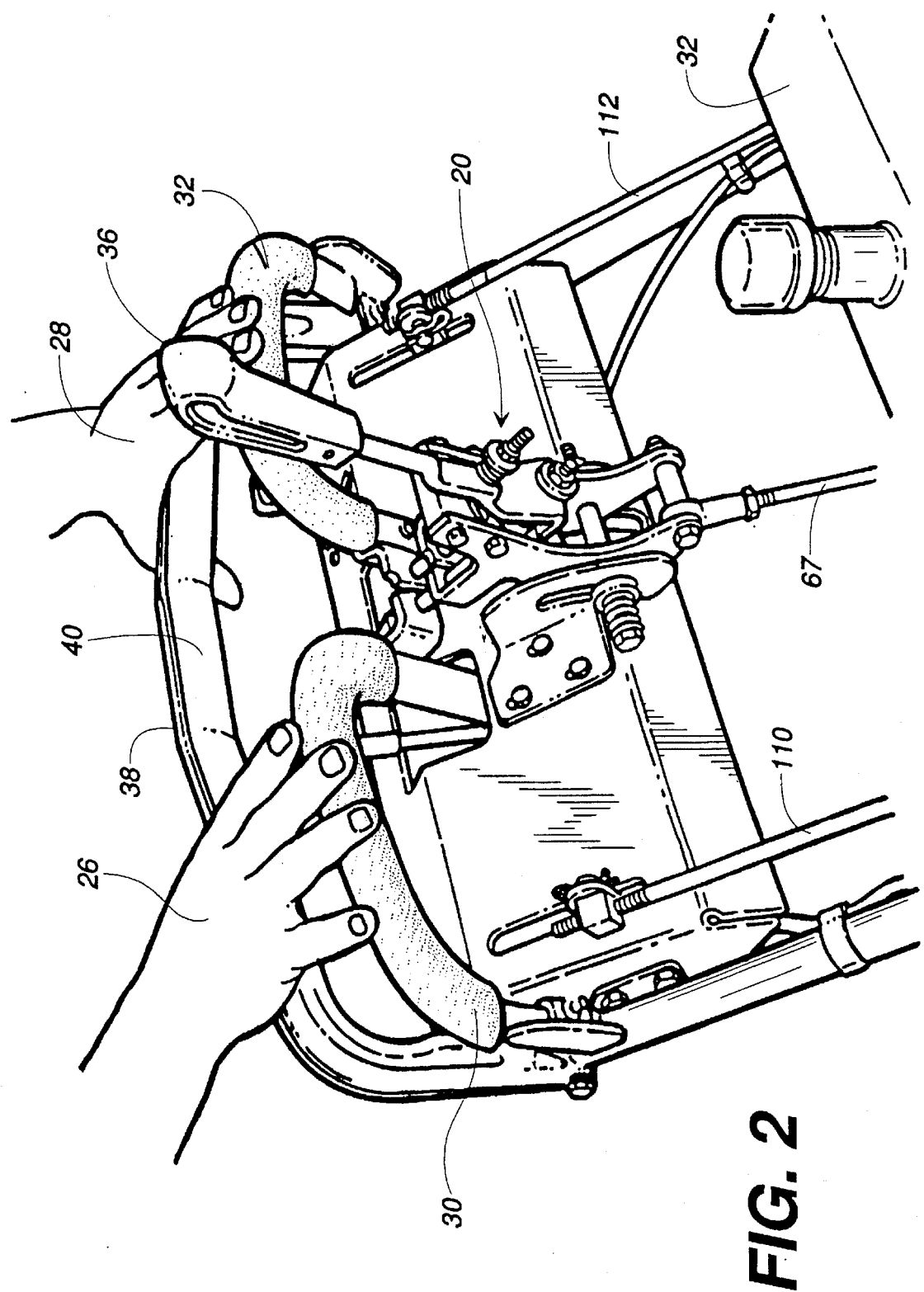
FIG. 2 is a front, right side pictorial partial view of the upper handle portion of the lawn mower of FIG. 1.
Figure 4:
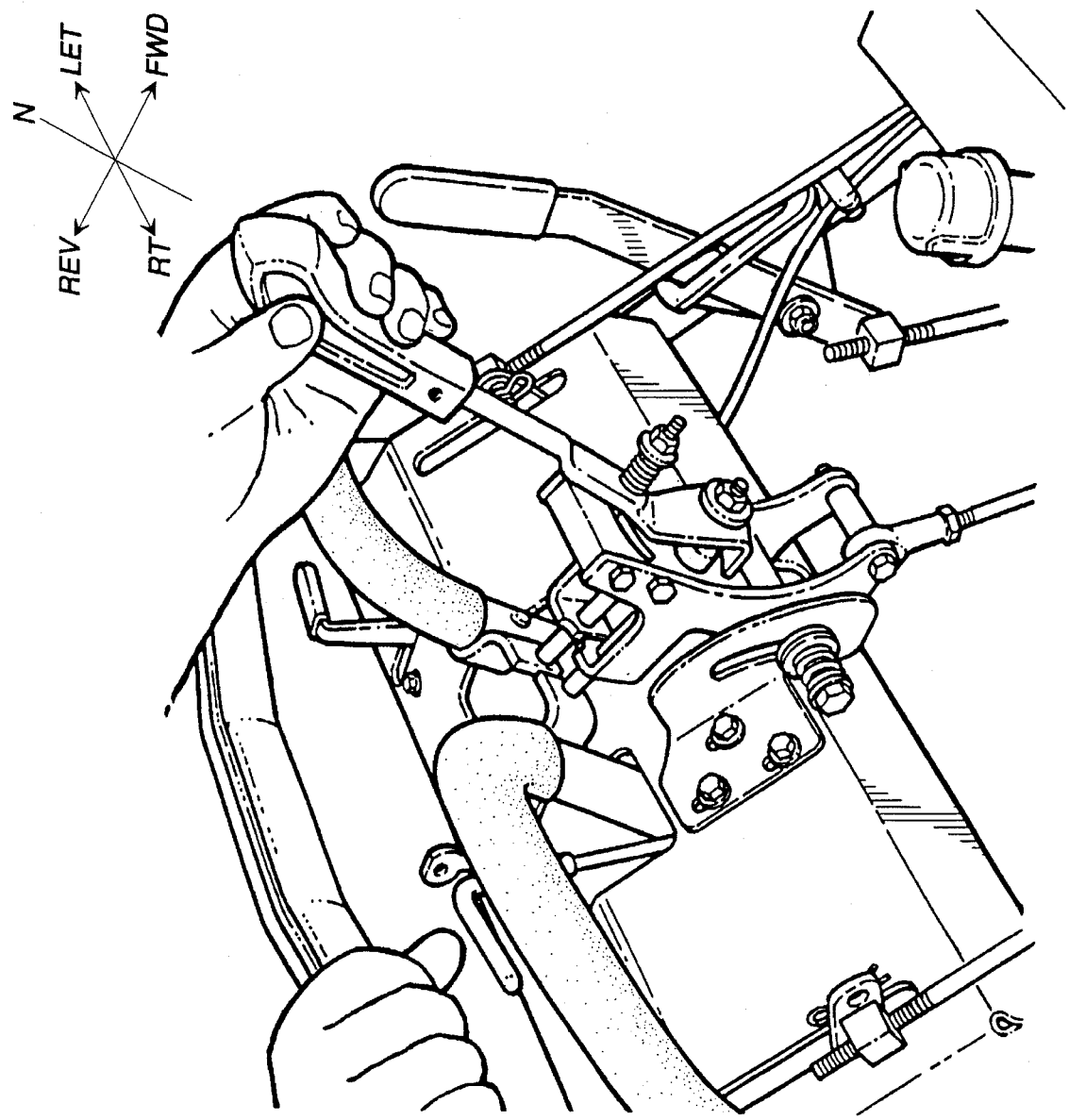
FIG. 4 is a view similar to that of FIG. 2, illustrating operation of the joystick, with the joystick in its maximum forward speed position, and with the trim leftward

By then pushing the joystick 36 forward or rearward with one hand (as shown in FIG. 4), the maximum forward speed of either of the drive wheels my be adjusted. By using the fingers of the operator's hands, the operator may draw back (against a spring bias force) upon both of the handles (as shown in FIG. 2) in order to slow down the fight or left drive wheels from the maximum set forward speed positions. By pulling the handles all the way back, the wheels may be brought to rest at a "neutral" position, and then into reverse. By manipulating the handles such that one wheel rotates at a forward speed, and the other wheel at substantially the same speed in reverse, the mower may be operated such that it has a "zero turning radius" (ZTR), or in other words the mower can rotate about a vertical axis located substantially between the drive wheels.

By pushing the joystick side-to-side, the set maximum forward speeds of the two wheels may be "trimmed", as discussed in later detail.

Figure 7:
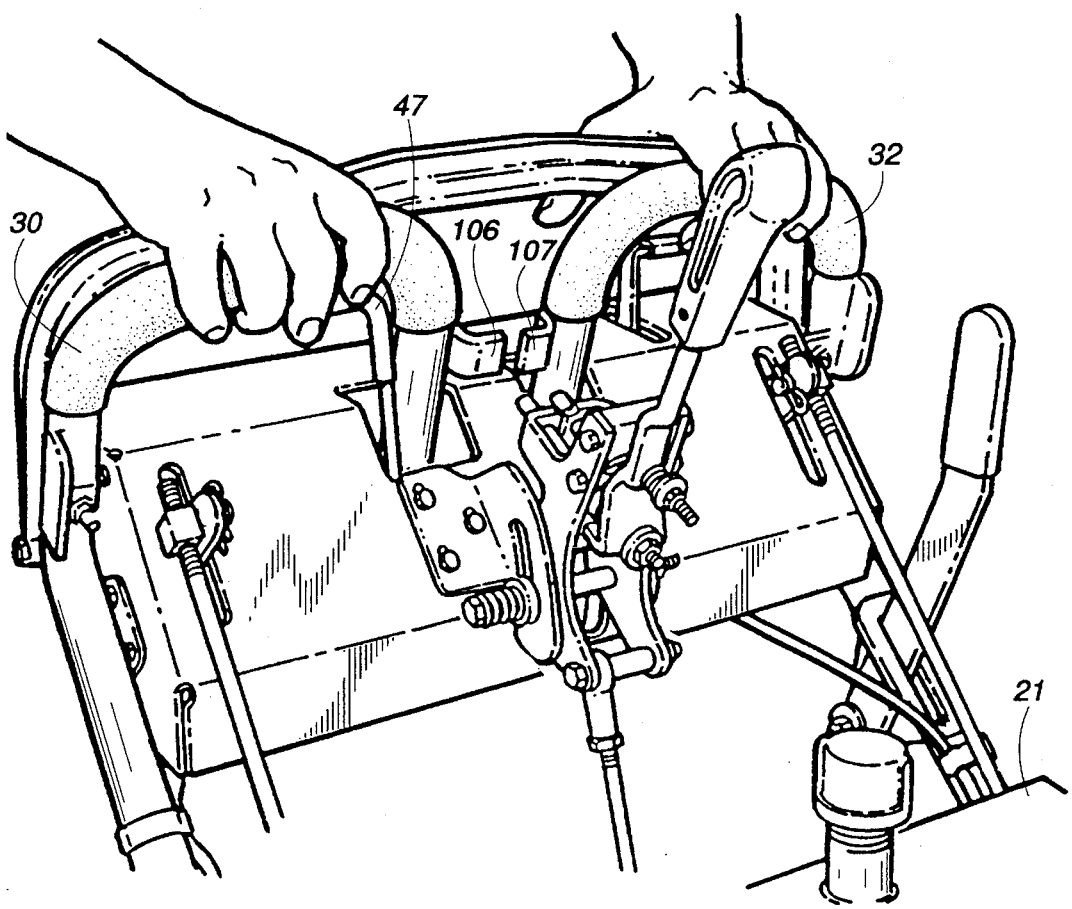
FIG. 7 is a view similar to FIG. 2, illustrating the operation of the locking disengagement lever, with the joystick in its maximum forward position, and the trim setting in substantially the center.

Also discussed later in further detail, when both of the handles 30, 32, are pulled back into their reverse positions, a latch 42 (See FIG. 5) will pivot rearwardly by a spring to force, and will then prevent either of the handles from going into their forward position until a disengagement lever 44 is pulled upwardly as shown in FIG. 7.

When the joystick is pulled all the way back, it provides a "park lock" feature, which is also discussed in further detail below.

DETAILED CONSTRUCTION AND OPERATION

The Trim Feature

As discussed above, the handle assembly 18 itself includes a trim control subassembly 20, right and left steering control handles 30, 32, an operator presence control bar 38, and a handlebar 40.

Figure 3:
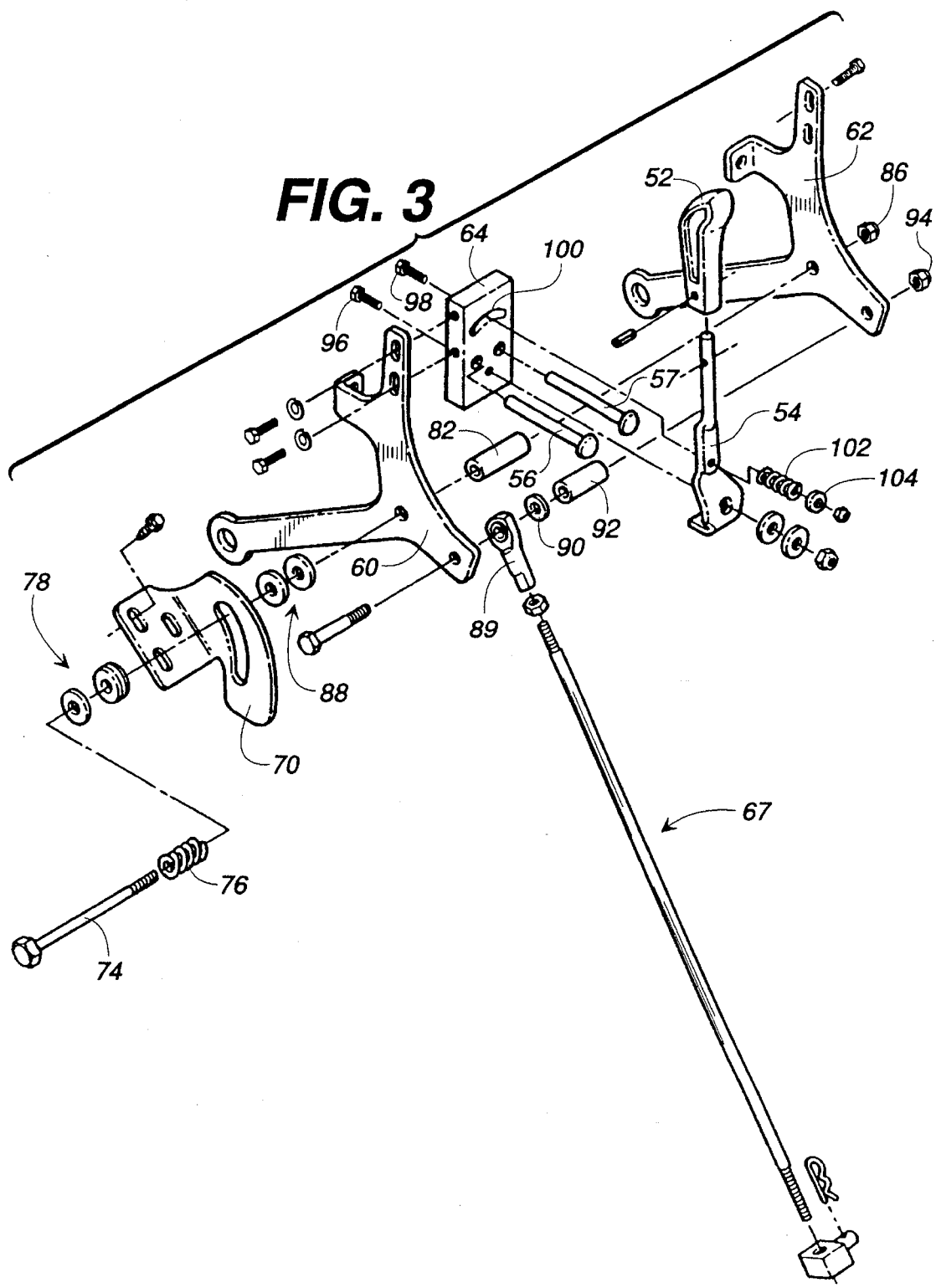
FIG. 3 is an exploded view of the trim subassembly and tie rod according to the present invention.

Referring now to FIG. 3, the trim control includes a grip 52, a joystick shaft 54, fight and left stop pins 56, 57, a right frame member 60, a left frame member 62, a template member 64, itself including an arcuate slot 66, and two pin holes which slidably accept the two stop pins 56, 57. The joystick subassembly likewise includes a friction plate 70, attached to a console 72 (See FIG. 5). Referring back to FIG. 3, the trim control subassembly 20 also includes a cross bolt 74, which passes through a compression spring 76 (which provides biasing), through washers 78, frame member 60, a sleeve 82, the left frame member 62 and is captured at the opposite end by nut 86. As discussed later in further detail, the trim control subassembly 20 is allowed to pivot about a substantially horizontal axis relative to the frame of the mower.

Park lock control rod assembly 67 is attached to the fight and left frame members 60, 62, by another crossbolt 88, which passes through the frame members, the upper end 89 of the park lock control rod assembly 67, a washer 90, a sleeve 92, and is captured at its opposite end by a nut 94.

The lower end of the joystick is captured by a bolt 96 which passes through a hole in the template 64, then passes through the joystick member, through washers, and is captured by a nut. There is a certain amount of adjustable controlled friction force in this assembly to allow the joystick to be pivoted side-to-side.

The joystick member 36 is spring-biased against the template 64 by means of a bolt 98, which passes through an arcuate slot 100 in template 64, through a hole in the joystick, through a compression spring 102 which provides a biasing force, and through a washer 104 to be captured finally by a nut.

As may be understood, the compression spring 102 provides a biasing force causing friction between the innermost washer 78 and the friction plate 70 attached to the handle of the mower, such that the joystick subassembly may be pivoted forwardly and rearwardly (about the longitudinal axis of bolt 74) against the frictional force, but the friction preferably provides sufficient force to maintain the joystick subassembly in its set or chosen position once pivoted.

Figure 5:
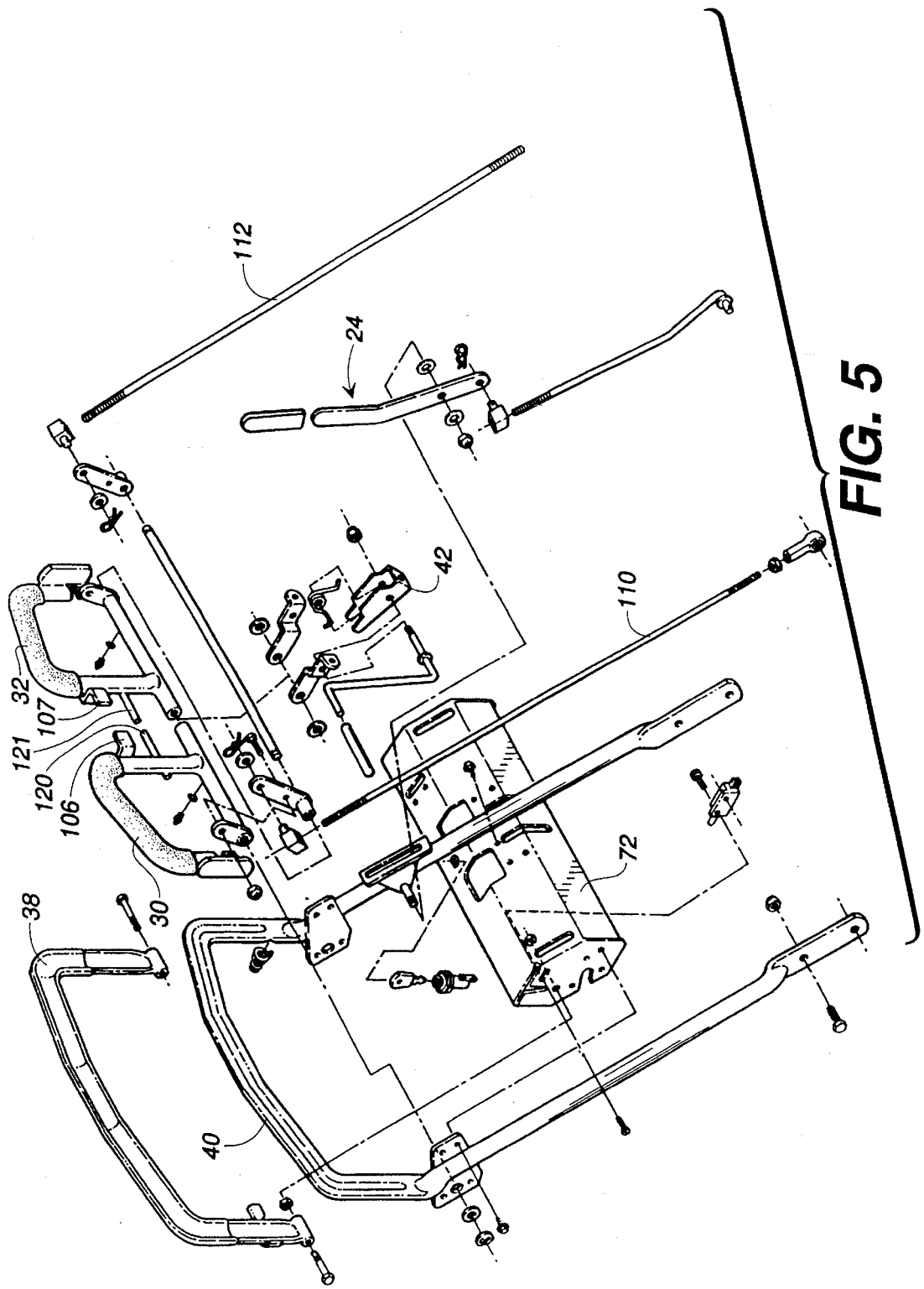
FIG. 5 is an exploded view of a part of the handle assembly according to the present invention.

Referring now to FIG. 5, illustrated are the handle member 40, the operator presence bar 38, the console element 72, and a pair of speed control rods 110, 112. By moving the right and left speed control handles 30, 32, the right and left control rods 110, 112 are moved substantially along their longitudinal axes. These rods are attached to pivoting pump arms such as the right pump arm 124 illustrated in FIG. 6 and left pump arm 125 shown in FIG. 9 these pump arms are attached to trunnion shafts which control valves within the pumps. It may be understood that by rotating the trunnion shafts in one "forward" direction from a "neutral" position (no fluid flow) through an internal valve structure the pump may direct flow through on fluid line to the fluid motors to create forward movement. By rotating the shafts in an opposite "reverse" direction, flow may be directed through a second set of lines to create reverse movement. Therefore the handles control the amount and direction of hydraulic fluid flow to the hydraulic pumps which drive wheels 17, 16, respectfully.

As may be understood, the joystick 36 includes an inclined or "cam" portion 36 which is preferably in contact at all times with the rounded heads of the stop pins, due to spring force which tend to push both handles 30, 32, forwardly. It may also be understood that the rearwardly-directed ends of the stop pins act as "stops" which contact tabs (See FIG. 7) which are fixed to the speed control handles 30, 32, respectively. The longitudinal stop pin axes are both above the pivoting axis of the joystick. As the joystick is pivoted side-to-side along a "pivoting" axis, the inclined surface causes the pins to slide in opposing directions relative to each other along their longitudinal axes. For example, if the joystick 36 is moved to the left as shown in FIG. 4, the left stop pin will be urged rearwardly by a force from the inclined surface, and the right stop pin will be allowed to move forward as more room is available, thus providing a stop for the left side steering control handle which is more rearward than that for the right side steering control handle, when both handles are not being grasped by the operator. Therefore, it may be understood that the left side steering control handle will stop before the fight side handle will.

The Neutral Latch Feature

Referring now to FIG. 5, a latching feature provided by the invention is illustrated. The crux of this latching mechanism is providing by a latching element 42, which includes a pair of stops one being a right stop 120 and the other being a left stop 121. It may be understood that when an operator provides both of handles 30, 32, in either a "neutral" or a "reverse" position, the latching element 42, being spring loaded, is allowed to engage a "latched" position (preventing the handles from going into forward but allowing them to remain in neutral or to be pulled into reverse) which may only be disengaged upon movement of unlatching lever 47 (against the spring load) as shown in FIG. 7. In the "latched" position, right and left latch pins 120, 121, respectively (attached to the speed control handles 30, 32) engage the stops 120, 121. It should be understood that the latching element will not go into its "latched" position until both handles are moved into either their neutral or reverse positions.

The Park Lock Feature

Figure 6:
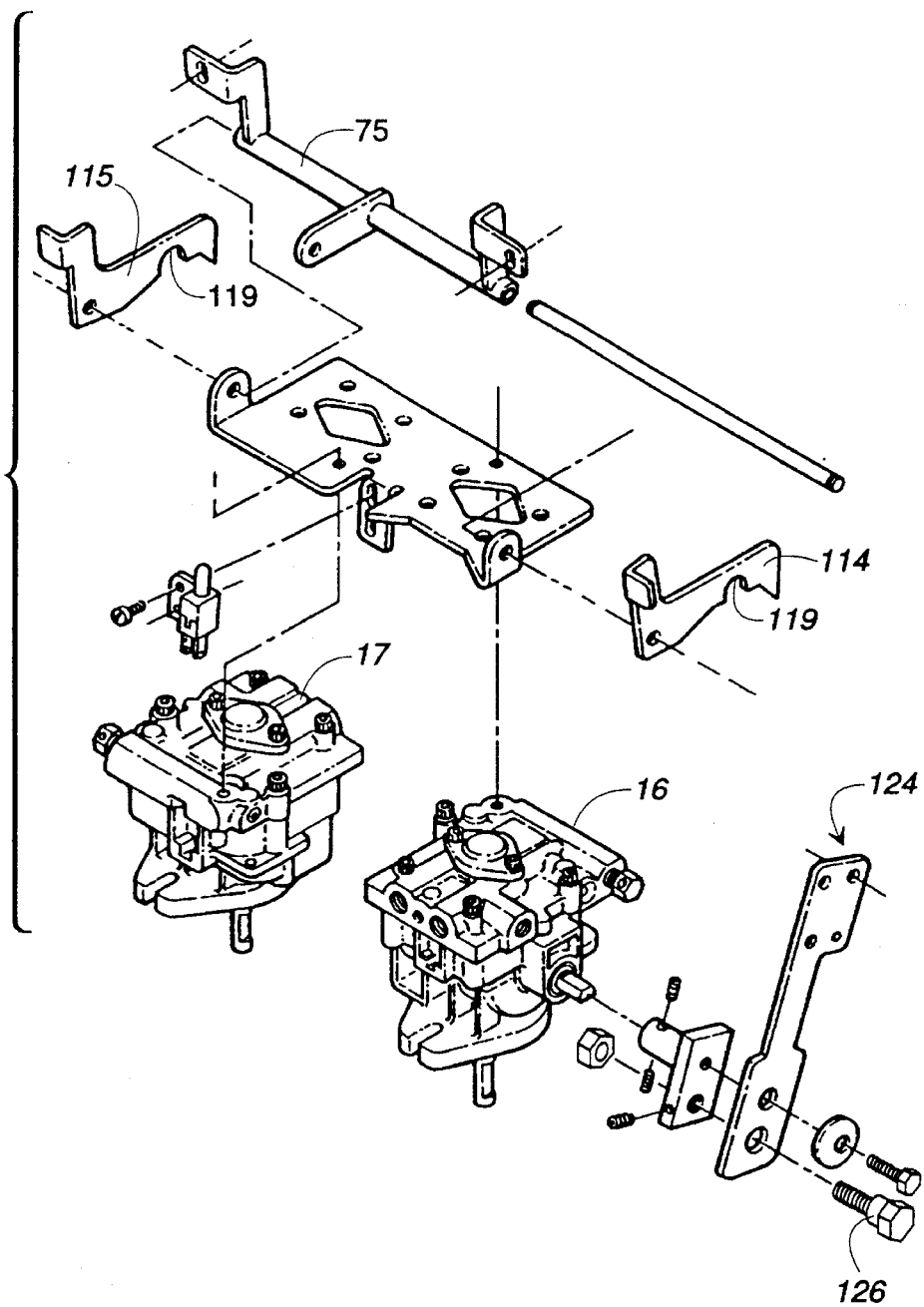
FIG. 6 is an exploded view illustrating the interaction of the hydraulic pumps and the lower locking bar.

Referring now to FIG. 6, right and left hydraulic pumps 16, 17 are illustrated. Also illustrated are right and left park lock template members 114, 115. The right and left park lock template members each include arcuate slots 119.

Figure 8:
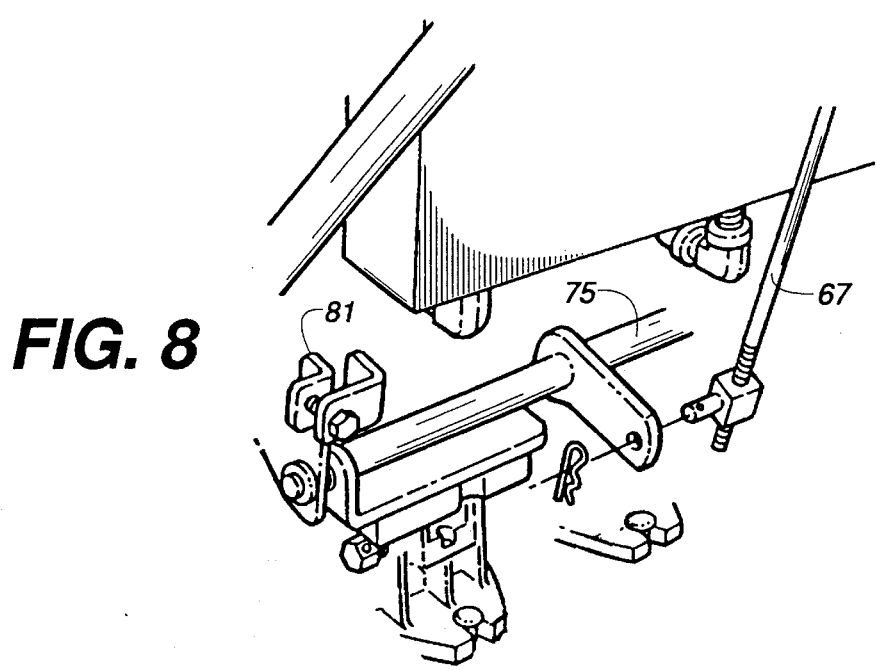
FIGS. 8 and 9 are pictorial partial view of some of the elements of FIG. 6.

As discussed above, the upper end of a tie rod assembly 67 is attached to the pivoting trim control assembly. As seen in FIG. 8, the lower end of this tie rod is attached to a pivoting bar member 75 (see also FIG. 6), which pivots substantially along a substantially horizontal axis, as the joystick is pivoted forward and rearward. This member has attached at each end right and left pivoting park lock template members 114, 115, respectively, which pivot along with the pivoting bar member 75, but also each may be adjusted by means of threaded members such as 97. It should be understood that the threaded members fix the park lock template members to the pivoting bar member, but also allow for relative adjustment.

Figure 9:
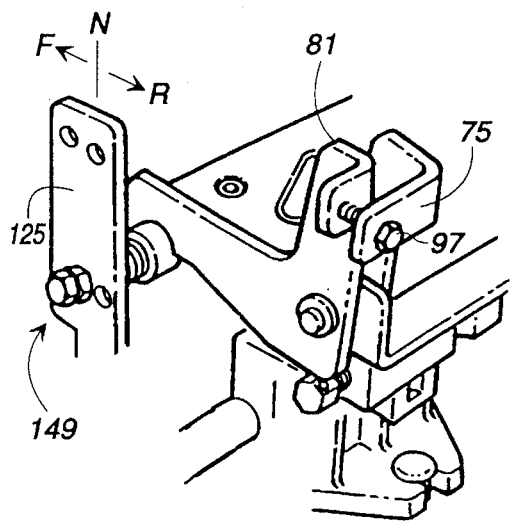
Figure 10:
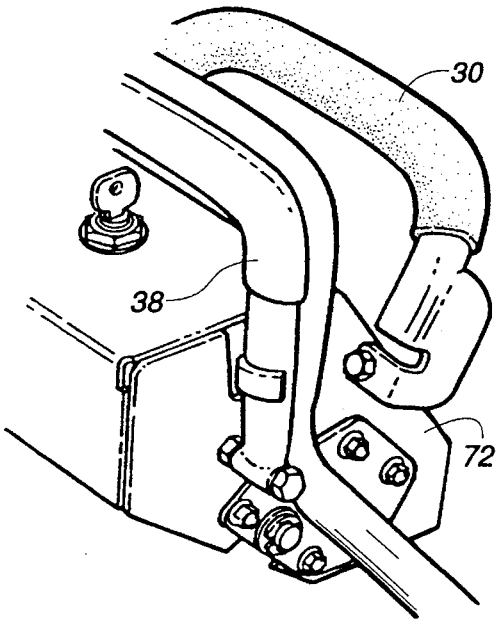
FIG. 10 is a rear, right side pictorial partial view of the upper handle portion of the lawn mower of FIG. 1.

As discussed above, the right and left park lock template members 114, 115, each include an arcuate slot 119, which are configured to accept corresponding roller members which as shown in FIG. 9 which are rotatably attached to right and left pump arms 124, 125, which are attached to trunnion shafts which control valves (not shown) in the pumps, which as discussed above control fluid flow to the corresponding hydraulic motors which drive the wheels.

When the joystick (which may also be referred to as a trim control handle) is moved into its neutral position from a forward position, the park lock control and assembly is moved rearwardly, thus causing the pivoting bar member 75 and the linked park lock templates 114, 115 to move downwardly, thus locking the trunnion shafts of the pumps by locking the pump arms 124, 125. This provides an advantageous "locking" feature which prevents the trunnion shafts from being rotated, thus preventing the drive wheels from being driven in either direction.

General Overall Operation

The mower may be stopped in different ways. One way is possible by using the joystick. By moving the joystick to the "neutral" position, by a series of rods, linkages, slots and notches, the trunnion shafts of both pumps may be locked in their "neutral" position, as described above.

Alternately, when the steering control handles may be simultaneously moved into their "neutral" positions, which will cause the neutral latch 42 to become engaged into its "latched" position. The joystick may then be moved into its neutral or park lock position.

Figure 11:
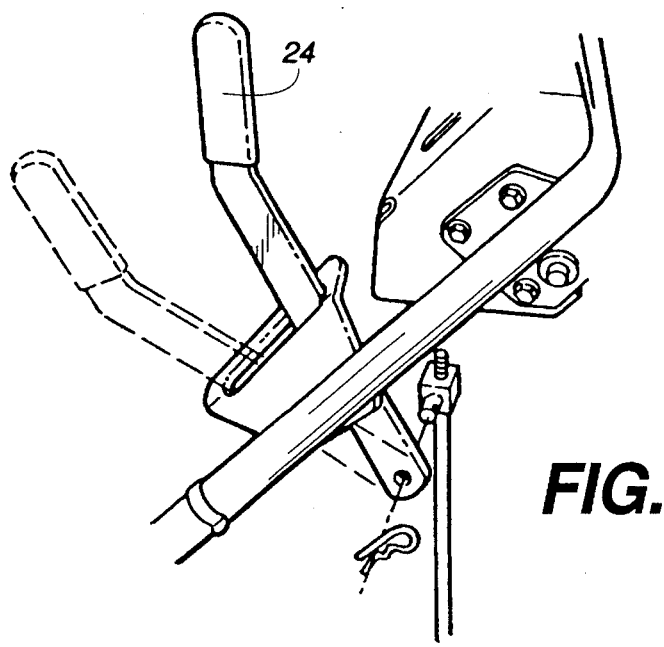
FIG. 11 is a left side view of the blade engagement lever.

In order to operate the mower 10, after the motor is running, the operator presence bar should be depressed against the handlebar. The blade clutch control 24 should then be engaged to its "ON" or down position such as shown in phantom in FIG. 11. The joystick should then be moved forward to select a slow travel speed. This simultaneously moves forward the two stops on the steering control handles. While holding the steering control handles in neutral, the neutral latch should be released by pushing the latch rearward. Simultaneously (and slowly) both steering control handles should then be released, causing them to move forward by the action of spring members and eventually to contact the stop pins. The joystick may then be further adjusted forwardly (more speed) or rearwardly (less speed) to a comfortable level. The operator should then proceed to go forward while allowing the mower to go in a straight line (if preferred). If the mower tends to veer towards the left or right, it can then be brought into a straight path by moving the joystick side-to-side.

To leave the mower running without the operator at the controls, the mower should first be situated upon flat terrain. If the mower is in forward, both steering control members should then be squeezed until the neutral latch is engaged. The blade clutch control should then be positioned in its "OFF" or disengaged position. The joystick should then be centered and pulled back firmly to its "park lock" position. The operator presence control may then be released and the mower engine will continue to run.

Figure 12:
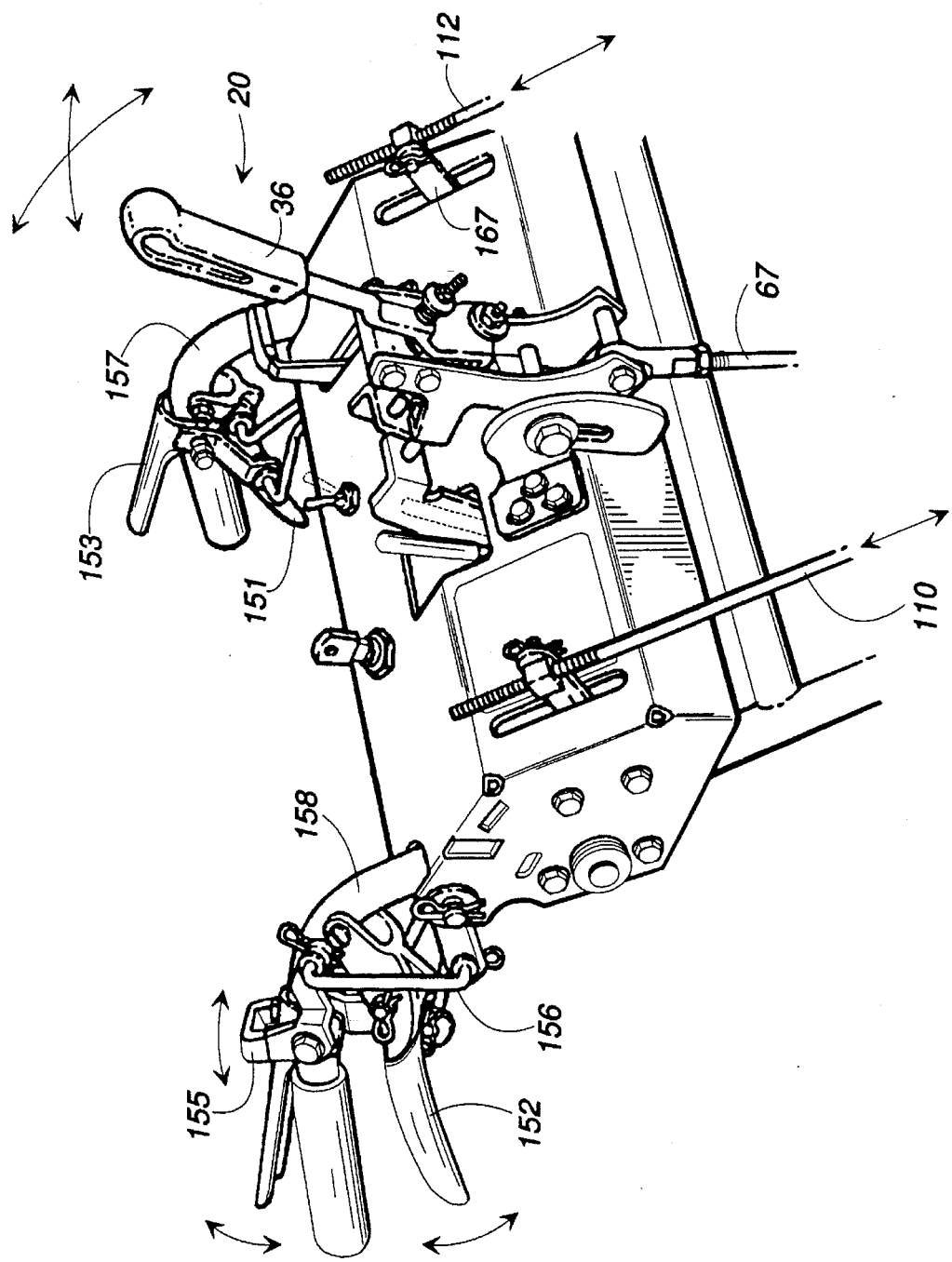
FIG. 12 is a view of a second hand control configuration, being a "pistol-grip" configuration, similar to the view of the first hand control configuration, being a "loop handle" configuration.
Figure 14:
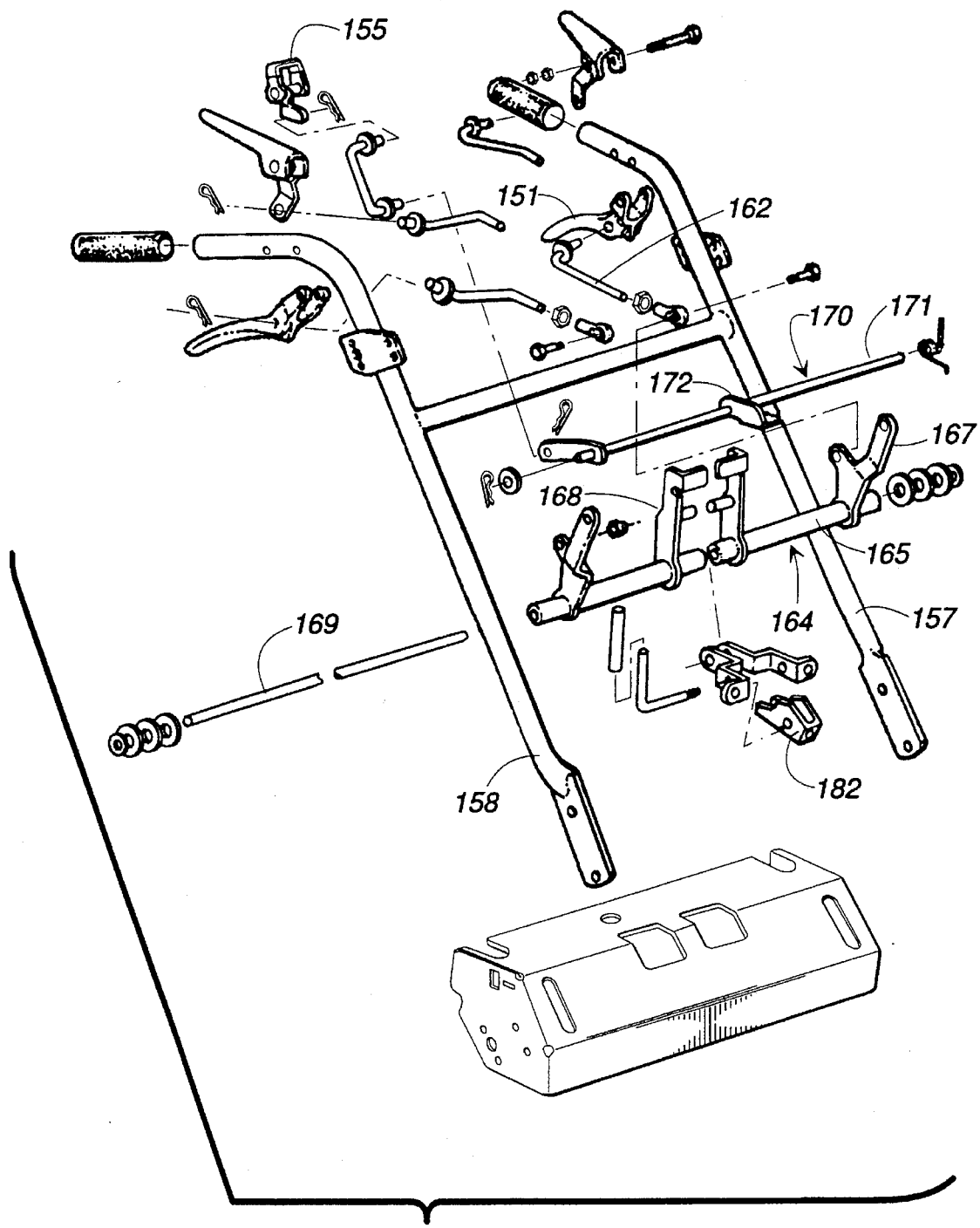
FIG. 14 is an exploded view of that shown in FIG. 12.
Figure 13:
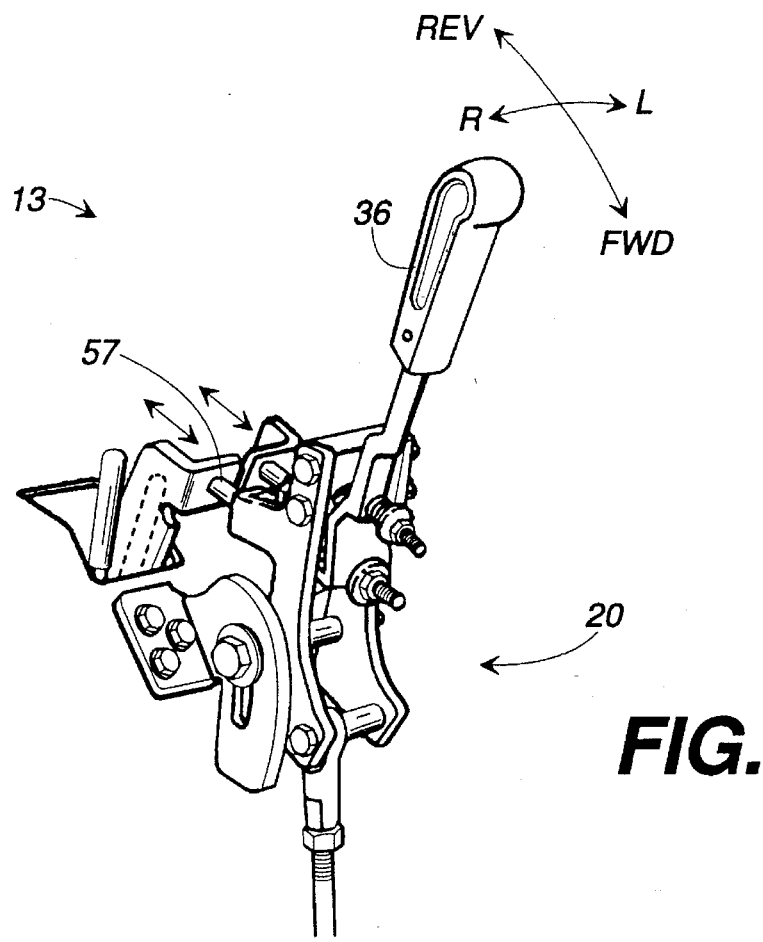
FIG. 13 is an isolated view of a portion of that shown in FIG. 12.

Referring now to FIGS. 12–14, an alternate operator control configuration is shown, which may be referred to as a "pistol grip" configuration 150 and can replace the "loop handle" configuration shown in FIG. 1. It should be under that this configuration provides an alternate means to control movement of the right and left speed control rods 110, 112, and the park lock control rod assembly 67. As in the previously-discussed "loop" handle control configuration, control of these rods provides control of the speed and direction of rotation of the drive wheels.

Referring particularly to FIG. 12, in such a configuration the operator controls the speed of the rear drive wheels of a unit by the use of left and right speed control handles 151, 152, respectfully. Left and right operator presence control levers 153, 154, and a neutral latch release lever 155 are also positioned as shown.

The trim control subassembly 20 including a joystick 36 is substantially similar in construction and operation to the unit 20 discussed previously and shown in FIG. 2.

The left and right speed control levers 151, 152 operate and are configured in a similar manner. Referring to FIG. 12, left grip lever 151 will be used as an example. Left lever 151 is pivotably attached to a handlebar member 157 along a substantially horizontal axis substantially perpendicular to straight-forward travel of the machine. A linkage 162 (See also FIG. 14) has its rear end attached to right speed control lever 152 and its front end attached to a left control linkage assembly 164. The left control linkage assembly 164 is substantially rigid and includes a sleeve 165, a stop flange 166 rigidly attached to the sleeve 165, and a speed control flange 167 also rigidly attached to the sleeve 165. The sleeve 165 is rotatably mounted on a rod 169, and the speed control flange 167 is also attached to a left speed control rod 112 (see FIG. 12) which is similar in configuration and operation to the element 112 previously discussed.

As may be understood, by squeezing the lever 151, the control rod 112 tends to be drawn rearwardly slowing and ultimately reversing travel of the left drive wheel. Conversely, if the lever is released, and both locks (neutral and park) are disengaged, the stop flange 166 is allowed to move forwardly under spring biasing until it is stopped by the presence of the left stop pin, which is adjustable as previously discussed.

Figure 14A:
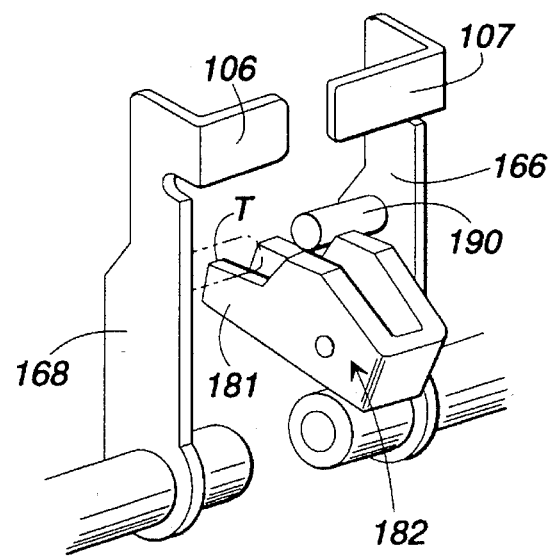
FIG. 14A is a close-up view of FIG. 14.

As in the unit described in conjunction with FIG. 1, the "pistol grip" control configuration includes "park lock" and "neutral latch" features. The park lock feature is similar to that shown in conjunction with FIG. 1, however the "neutral latch" is slightly different. As in the previously described unit, the neutral latch is engaged when both speed control rods are in either their "neutral" or "reverse" positions. However, to facilitate this, a thumb-operable neutral latch release lever 155 is used through a linkage 156 to operate a neutral latch release assembly 170, which includes an elongate rod 171 and a release tab 172 rigidly attached thereto. The assembly 170 is pivotably attached relative to the handlebar frame, along the longitudinal axis of the rod 171 By urging the thumb release lever 155 rearward, the linkage 156 is moved generally rearward, causing the neutral latch release rod assembly 170 generally counterclockwise as the unit is viewed in FIGS. 12 and 14. This movement causes the release tab 172 to contact the tip T of one of the ears 181 (See FIG. 14A) of the latching element 182, which is spring-loaded. Further urging causes both pins 190 to become disengaged from stops defined by the latching element 182. This allows either wheel to be driven forward.

To operate the unit, the blade clutch control should be placed in its "OFF" position. The joystick 36 should then be pulled back into its centered, "park lock" position. The engine should then be started and throttled to an appropriate safe level.

To mow, at least one of the operator presence levers 153, 154 should be depressed against its respective handlebar 157, 158. The blade may then be engaged. The joystick 36 may then be moved forward, such as ½", selecting a slow speed. While holding both speed control levers 151, 152 in their neutral positions, the neutral latch release lever 155 may be released by pulling back with the thumb. By simultaneously and slowly releasing both speed control levers 151,152, the machine should begin to move forward.

To adjust the forward speed of the machine, the joystick 150 may be adjusted by, for example, pushing it forwardly to increase forward ground speed. As discussed with respect to the "loop" handle design of FIG. 1, by moving the joystick left-to-right or vice versa, the direction of the machine may be "trimmed".

To stop the apparatus, both speed control levers 151, 152 are simultaneously squeezed such that the levers 151,152, are both past their "neutral" position. This will result in the neutral latch being engaged. At this point, the blade clutch control may be moved to its "OFF" position. The joystick 150 may then be placed in its center position, and pulled rearwardly to its "park lock" position. The throttle control may then be slowed and ignition killed.

Figure 15:
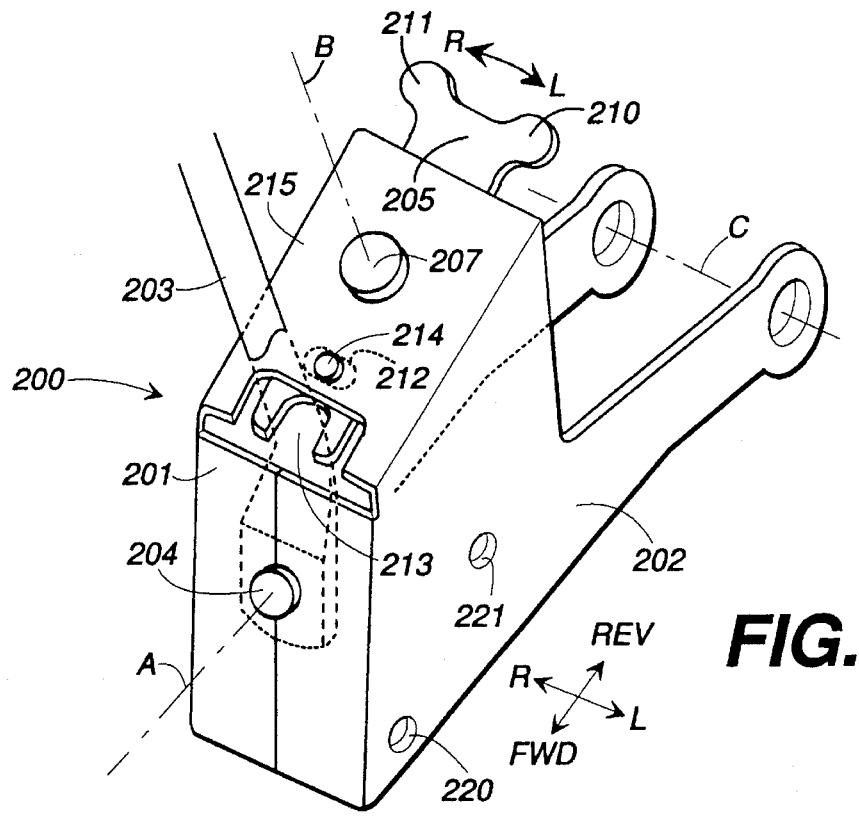
FIG. 15 is a pictorial view of an alternate joystick control which may be used in conjunction with the overall mowing apparatus of FIG. 1.

Referring now to FIG. 15, an alternate trim control subassembly 200 is shown, which may be used to replace a portion of the previously discussed subassembly 20. The subassembly 200 includes a body having left and fight halves 201,202, respectfully, rigidly attached together as known by the art. A joystick 203 is pivotably mounted about axis "A" by a suitable fastener 204, such that the hand of an operator (not shown) may pivot the joystick side-to-side similar to the action discussed above. A stop plate 205 is likewise pivotably mounted relative to the body of the subassembly 200, about an axis "B" by a suitable fastener 207 which extends through a hole in the step plate and a hole in the two-part body of the trim control subassembly. In one preferred embodiment, axes A and B are coplanar.

Figure 16:
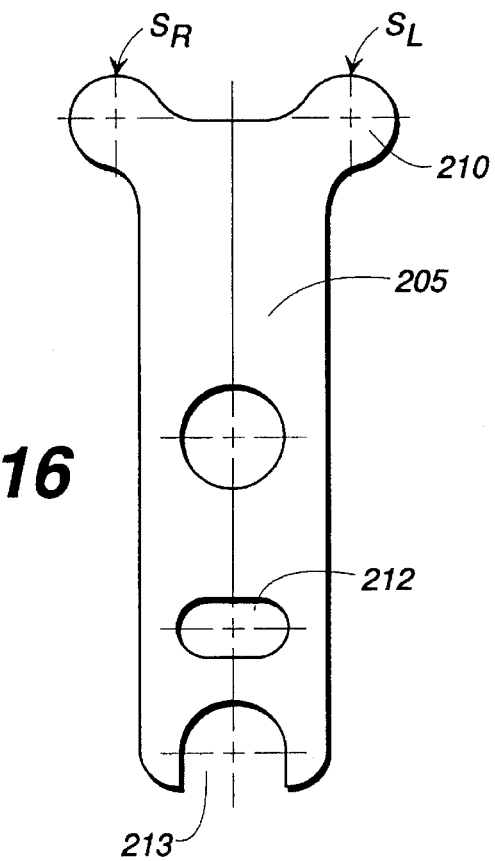
FIG. 16 is a top plan view of a step plate or "dog bone" accounting to the present invention.

The stop plate 205, also referred to as a "dog bone" (see FIG. 16), includes fight and left stops 210, 211, in the form of "ears", and likewise includes a transverse, "closed" slot 212, and a longitudinal, "open" slot at location 213. A limiting fastener 214 extends rigidly down from the underside of the top wall of the body of the unit 200 and fits within slot 212 and limits the pivoting range of the stop plate 205 about axis B. The length of the slot 212 determines the amount of steering adjustment or "trim" allowed the mower. The limiting fastener 214 also serves to provide a frictional engagement between the body 200 and the stop plate 205. It may be understood that this frictional relationship may be varied by adjustment means known in the art. The purpose of the frictional engagement is to keep the stop plate in place notwithstanding vibration, but still to allow relative adjustment of the stop plate by manually overriding the frictional engagement.

A portion of the joystick 203 engages the open slot of the stop plate at location 213. As may be understood, pivoting of the joystick 203 about axis A causes corresponding pivoting of the stop plate 205 about axis B. For example, in referencing the directional arrows in FIG. 15, a left-to-right movement of the upper end of joystick 203 will cause the rear end of the stop plate 205 to pivot about axis B in a generally right-to-left fashion. Left and fight ear-shaped stops 210, 211 are configured to provide variably adjustable "rearwardmost stopping surfaces" (similar to those provided by the rear tips of the stop pins 57, 56), which provide stops to the tabs 107, 106 shown in FIGS. 5, 7, 1 or 14A. As may be understood, as the trailing end of the stop plate (the one with the ears) is urged to the left ("L" as shown in FIG. 15) the rearwardmost contact surface of the left stop 210 will be moved forwardly, and the rearwardmost contact surface of the right stop 211 will be moved rearwardly (assuming a start from a centered position). Regardless of its starting point, it should be understood that as the joystick is moved left-to-right, the rearwardmost stopping surface of the left stop 210 is moved forward relative to the rearwardmost stopping surface of the right stop 211. As the joystick is moved right-to-left, the rearwardmost stopping surface of the left stop 210 is moved rearward relative to the rearwardmost stopping surface of the right stop 211. Therefore, it may be seen how the joystick 203 may be used to "trim" a mowing unit 10 such as shown in FIG. 1 in a side-to-side manner.

As may be understood, holes such as 220, 221, are used to mount the body of the subassembly relative to the frame and park lock control rod assembly such as shown in FIG. 2. The unit 200 is pivotably mounted relative to its overall mowing unit along axis C.

Adjustments

The mower should be adjusted periodically for maximum efficiency.

To adjust the mower so that the "park lock" feature is effective, the engine should be stopped and the joystick should be pulled fully backwards to its "park lock" position. As discussed earlier, in this position, both of the neutral lock cavities should fully engage the roller bearings on each pump arm. If such is not the case for a particular pump arm, the adjustment screws 97 (shown in FIG. 9) are provided. By adjusting these screws, the misaligned template members 114 or 115 may be adjusted so that its associated arcuate slot fits on its corresponding roller member.

In addition, a neutral adjustment is also provided at the pump trunnion shafts through the means of an eccentric mounting bolt 126, as shown in FIG. 9, this eccentric bolt works in cooperation with a template 127, which is attached to each pump arm. By adjusting the eccentric bolts 126, the adjustment can be made to the angular relationship of a pump trunnion shaft relative to the corresponding pump lever. Thus adjustment may be made to cause wheel motion to stop when the "park lock" feature is engaged. The above-referenced eccentric bolt fits with holes 148 (See FIG. 6) which extend through the left pump arm.

Conclusion

While this invention has been described in specific detail with reference to the disclosed embodiments, it will be understood that many variations and modifications may be effected within the spirit and scope of the invention as described in the appended claims.

What is claimed is:

1. A lawn mower capable of traveling in a straight forward direction and also turning left and right under the control of an operator, said lawn mower comprising:

a frame;

an internal combustion engine mounted to said frame;

at least one vegetation cutting blade;

means for rotatably driving said blade by said engine;

first and second drive wheels rotatably mounted relative to said frame, for propelling said frame relative to the ground from rest to a forward speed;

first and second drive train means for transferring power from said engine to corresponding first and second drive wheels to cause each of said first and second drive wheels to rotate from rest to a set forward speed;

first and second speed control means, each independently movable from a neutral position to set forward position, said first and second speed control means independently controlling the amount of forward speed of said first and second drive wheels; and first and second stop means for setting said set forward positions of said first and second speed control means, to allow said operator to independently limit the amount of speed obtained by said drive wheels, said first and second stop means adjustable relative to each other and together comprising:

a) a trim control body mounted relative to said frame; and b) a stop plate mounted relative to said trim control body and defining first and second stop cams each defining corresponding first and second stop surfaces for limiting the forward travel of said first and second speed control means, said stop plate being movable by an operator relative to said trim control body to allow said operator to adjust the positions of said first and second stop surfaces relative to each other, in order to independently adjust the first and second set forward speeds of said first and second drive wheels.

2. The claim as set forth in claim 1, wherein said stop plate is pivotably mounted along a first axis relative to said trim control body, to allow an operator to pivot said stop plate relative to said trim control body in order to vary the relative positions of said first and second stop surfaces and correspondingly the relative forward speeds of said first and second drive wheels.

3. The claim as set forth in claim 2, wherein said trim control body is pivotably mounted along a second axis relative to said apparatus frame, to allow an operator to move said stop plate generally forward-to-rearward relative to the straight forward travel of said lawn mower, in order to simultaneously vary the positions of said first and second stop surfaces and correspondingly the relative forward speeds of said first and second drive wheels, said second axis being substantially perpindicular to said direction of straight forward travel of said lawn mower.

4. The lawn mower as claimed in claim 2, wherein said first and second stop means further comprises a operator-grasped joystick which is pivotably attached relative to said trim control body and operably associated with said stop plate such that left-to-right pivoting of said joystick allows said operator to turn said lawn mower rightward.

5. The lawn mower as claimed in claim 4, wherein said stop plate is maintained in place between adjustments by frictional engagement.

6. A lawn mower capable of traveling in a straight forward direction and also turning left and fight under the control of an operator, said lawn mower comprising:

a frame;

an internal combustion engine mounted to said frame;

at least one vegetation cutting blade;

means for rotatably driving said blade by said engine;

first and second drive wheels rotatably mounted relative to said frame, for propelling said frame relative to the ground from rest to a forward speed;

first and second drive train means for transferring power from said engine to corresponding first and second drive wheels to cause each of said first and second drive wheels to rotate from rest to a set forward speed;

first and second speed control means, each independently movable from a neutral position to set forward position, said first and second speed control means independently controlling the amount of forward speed of said first and second drive wheels; and first and second stop means for independently setting said set forward positions of said first and second speed control means, to allow said operator to independently limit the amount of speed obtained by said drive wheels, said first and second stop means adjustable relative to each other; and single point trim control means for adjusting said first and second stop means relative to each other.

7. The lawn mower as claimed in claim 6, wherein said left and right speed control means in combination include left and right speed control pistol grips pivotably attached relative to said frame of said lawn mower, said left and right speed control pistol grips configured to allow an operator to control the speed of said first and second drive wheels by manually manipulating said left and right speed control pistol grips.

8. The lawn mower as claimed in claim 6, wherein said left and right speed control means in combination include left and right speed control loop handles pivotably attached relative to said frame of said lawn mower, said left and right speed control loop handles configured to allow an operator to control the speed of said first and second drive wheels by manually manipulating said left and right speed control loop handles.

9. The lawn mower as claimed in claim 6, wherein said single point control means is a joystick.

10. The lawn mower as claimed in claim 7, wherein said single point control means is a joystick.

11. The lawn mower as claimed in claim 8, wherein said single point control means is a joystick.

* * * * *